United States Patent [19]

Tandon et al.

[11] 4,438,457
[45] Mar. 20, 1984

[54] HIGH RESOLUTION IMAGER EMPLOYING STAGGERED SENSOR STRUCTURE

[75] Inventors: Jagdish C. Tandon, Fairport, N.Y.; Narayan K. Kadekodi, Torrance, Calif.; Abd-El-Fattah A. Ibrahim, Palos Verdes Estates, Calif.; Roland J. Handy, Northridge, Calif.; James C. Stoffel, Rochester, N.Y.

[73] Assignee: Xerox Corporation, Stamford, Conn.

[21] Appl. No.: 284,742

[22] Filed: Jul. 20, 1981

[51] Int. Cl.³ .............................................. H04N 3/14
[52] U.S. Cl. .................................................. 358/213
[58] Field of Search .............. 358/212, 213, 109, 113, 358/293, 294, 280, 41, 43, 44, 48, 54, 75, 78; 250/208, 209, 211 R, 578; 357/24 LR

[56] References Cited

U.S. PATENT DOCUMENTS

| | | |
|---|---|---|
| 3,940,602 | 2/1976 | Lagnado et al. ................... 235/181 |
| 4,010,319 | 3/1977 | Levine ................................ 358/213 |
| 4,012,587 | 3/1977 | Ochi et al. ......................... 358/213 |
| 4,031,315 | 6/1977 | Pfleiderer ......................... 358/212 |
| 4,032,976 | 6/1977 | Levine ................................ 358/213 |
| 4,064,533 | 12/1977 | Lampe et al. .................... 358/105 |
| 4,081,841 | 3/1978 | Ochi et al. ......................... 358/213 |
| 4,084,190 | 4/1978 | Stein .................................. 358/213 |
| 4,084,192 | 4/1978 | Defranould et al. .............. 358/213 |
| 4,146,786 | 3/1979 | Agulnek ............................. 250/235 |
| 4,178,614 | 12/1979 | Sauer ................................. 358/213 |
| 4,189,749 | 2/1980 | Hiroshima et al. ................ 358/167 |
| 4,192,015 | 3/1980 | Tompsett .......................... 365/114 |
| 4,200,892 | 4/1980 | Weimer ............................. 358/213 |
| 4,209,806 | 6/1980 | Noike et al. ...................... 358/213 |
| 4,271,428 | 6/1981 | Herbst ................................. 358/75 |
| 4,272,684 | 6/1981 | Seachman ........................ 250/578 |

Primary Examiner—Richard Murray
Attorney, Agent, or Firm—Franklyn C. Weiss

[57] ABSTRACT

A high density charge coupled device imaging array 58 with a bilinear array 60, 62 of photosites on a single integrated circuit chip is utilized in an image scanning configuration. Offset photosites 60a, 62a in two rows are coupled via transfer gates 64 to storage register 72 and then to two shift registers 74, 76, and via transfer gates 66 directly to two shift registers 68, 70 in a quadrilinear array. The output of these four shift registers 68, 70, 74, 76 are multiplexed to generate a single output pulse train representative of the information scanned.

4 Claims, 4 Drawing Figures

HIGH RESOLUTION IMAGER EMPLOYING STAGGERED SENSOR STRUCTURE

This invention relates to a high resolution imager employing astaggered CCD sensor structure which permits high resolution imaging on a relatively short silicon substrate to generate a single pulse train indicative of scanned information, utilizing a quadrilinear structure register array.

BACKGROUND OF THE INVENTION

Image scanners are used to convert information from one medium to another. For example, in document scanning the information on a document is converted from printed matter on a page to electrical signals for transmission to another unit, for information handling, for electronic storage, etc.

Charge coupled devices (CCD's) utilizing charge transfer technology are one modern application of technology useful in image scanners. Light is impinged on the photosites on a CCD device, the device detects this information and converts it to electrical signals for subsequent use. The familiar integrated circuit structure on a chip of a few tenths of an inch by a few tenths of an inch (8 mm × 8 mm) does not lend itself to CCD imager structure. If optics are eliminated, a CCD imager would have to be as wide as the page being scanned, and located within several thousandths of an inch from the page to achieve adequate resolution. The cost of such a device would be extremely high because the manufacturing yield of such a large device would be very, very low. Thus, shorter CCD devices have been used but these have concomitant drawbacks. When several shorter CCD imagers are used to sense the same object line, the ends of the photosensor arrays must overlap optically or mechanically or else a narrow stripe on the scanned page will be blank. Further, complicated optics for page width scanners must be utilized.

Use of small, dense, linear CCD imagers has also been shown with the use of reduction optics. However, when the size of the image device is reduced, the resolution suffers due to the limited number of available photosites. One method known to solve this problem is the use of CCD imagers with beam splitter optics. That is, the optics divide the scanned light information into two or more beams, one for each CCD imager, depending on the resolution desired. However, the cost is also very high in this technique due to added electronics and optics. One example of such a system is disclosed in Ser. No. 949,179, filed Oct. 6, 1978 and assigned to the same assignee.

According to the present invention, a high density CCD imaging array with a bilinear array of photosites on a single integrated circuit chip is utilized in an image scanning configuration. Offset photosites in two rows are coupled by transfer gates and utilizing a storage register to four shift registers in a quadrilinear array. The output of these shift registers are multiplexed to generate a single output pulse train representative of the information scanned.

DESCRIPTION OF THE DRAWINGS

For a more complete understanding of the invention, reference may be had to the following detailed description of the invention in conjunction with the drawings wherein.

DETAILED DESCRIPTION OF THE INVENTION

Figure 1:
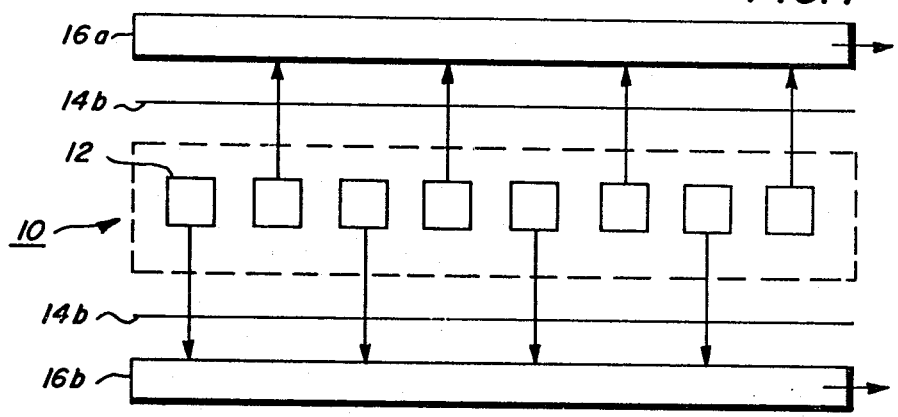
FIG. 1 is a schematic diagram of a charge coupled imaging device for use in an imaging system typically known in the industry.

FIG. 1 shows a charge coupled device 10 already known in the industry for use as an image sensor in an imaging system. A plurality of photosites 10 would be deposited in the normal prior art manner for construction of such a CCD. These photosites, being sensitive to the amount of light impinged upon themselves, deposit a requisite amount of charge beneath in response to the applied light. Via CCD transfer gates 14a and 14b, the stored charge beneath each photosite 12 is transferred to their respective shift registers 16a and 16b. As can be seen in FIG. 1, all the odd photosites are coupled to shift register 16b and all the even photosites are coupled to shift register 16a. At the proper time, the information is shifted out to the right (or left) side of the device 10 to subsequent circuitry. Such subsequent circuitry would mix the outputs of registers 16a and 16b such that the output pulse train would be representative of the input applied light information. All of the above circuitry could be on the same integrated circuit chip as in the circuitry shown in FIG. 1.

In operation, as in an image scanning device such as a facsimile transmitter or document processor, relative motion would exist between the image scanner, including CCD 10, and the document or other manifestation being scanned. Thus, for example, the CCD 10 would move down the page in which FIG. 1 is depicted, thus translating through the image of the document being scanned; or, of course, CCD 10 could remain stationary with the document moving in the upward direction; or both. The imaging light beam would reflect from the document onto the photosites of device 10. Focussing and other optics, not shown, may also be utilized. As the document is relatively moved in relation to the scanner embodying the device 10, the outputs of shift registers 16a and 16b are representative of the information on the document in a line by line representation.

Figure 2A:
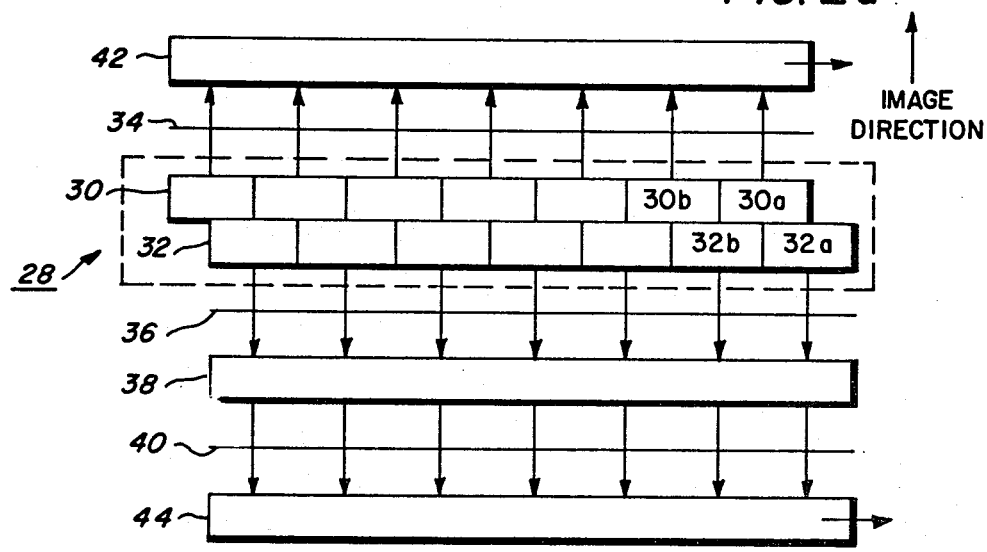
FIG. 2A is a schematic diagram of a charge coupled imaging device for use in an imaging system in accordance with the principles of the present invention set forth in a copending application.

FIG. 2A shows a CCD imaging device disclosed and described in copending application IP/790879 which is similar to that of FIG. 1 but with a major difference. Two rows of photosites 30, 32 are provided, one offset from the other, on a single CCD integrated circuit chip 28. With the photosites offset, as shown, the density of the photosites on one CCD imager is increased and also the scan resolution is increased due to the fact the information that exists between the photosites is now detected by the additional row of photosites. Thus, row 32 of photosites detects part of the information by sampling image data at the centers of the row 32 of photosites, and row 30 detects additional information by sampling at the centers of the row 30 detectors midway between the row 30 detectors, which information will be joined electrically later as hereinbelow described.

As set forth above in conjunction with the description of FIG. 1, there is relative motion between CCD 28 and the document or other than being scanned. For this figure, it is assumed for purposes of description that the image of document is moving upward while the CCD 28 remains stationary. At time t0, then, the first line of information to be scanned appears on the row 32 of photosites. Any means for direction of this light information may be used. That is, reflective optics, or transmissive optics, or direct projection thereon can be manifested. At this time, or previously, all other stored information in CCD 28 has been cleared, or is subsequently ignored. At time t0, therefore, the information on the first scan line is detected by the row 32 of photosites. If the line of data is seen from right to left, photosites 32a would detect the first bit of data on the line, while photosite 32b would detect the third bit of data on the line.

Before the next scan line of data is stepped or moved into position to be scanned by row 32 of photosites, that is, at time t1, the information detected by this row 32 of photosites and stored thereat is transferred by transfer gates 36 to storage or holding register 38. Thus, register 38 now has stored the information which used to be stored below the photosites 32. The row 32 of photosites now awaits scan line two to be presented to it, while row 30 of photosites now awaits the first scan line.

At time t2, the second line of scan data is detected by row 32, while the first line of scan data has reached row 30. Row 32 now reads or detects the information in the second line of scan data. Row 30 is now reading the spaces between the photosites in row 32. That is, bits two and four are now read by photosites 30a and 30b, respectively. Photosites 32a and 32b are reading, respectively, the first and third bits from the second scan line of data.

At t3, before the next scan line of data is incremented before the CCD imager, the contents of register 38 are transferred via transfer gates 40 to shift register 44. Then the contents of row 32 of photosites are transferred via transfer gates 36 to storage register 38. The contents of row 30 of photosites are transferred to shift register 42 via transfer gates 34. It is now seen that shift register 44 contains the even bits of data from the first scan line of data while shift register 42 contains the odd bits of data from the same first scan line of data.

At t4, the next lines of data are brought before the rows 30, 32 of photosites, while shift registers 42, 44 are pulsed with a high frequency shift signal at this time to shift out the stored signals. Thus, the contents of these two shift registers are shifted out and joined i.e., multiplexed, into a single pulse train either on the same integrated circuit chip or by subsequent external circuitry.

The scan, shift, and transfer procedure continues with the rows 30, 32 of photosites reading every line desired in sequential fashion as described above. If each line of photosites contains 3000 CCD photosites, for example, then 6000 points or pixels of data can be read per inch, or other resolution if reduction optics are utilized.

The storage register in FIG. 2A may be a duplicate of a row of photosites with a light shield over it. No horizontal shifting is required in this region as it is for shift registers 42, 44.

The two linear photosensor arrays are generally located in close proximity to each other so that they can sample adjacent (or nearly adjacent) portions of the same image and reconstruct a single scan line with a minimum of data storage requirements. It is possible to accommodate much larger separations between the two photosensor arrays on the same substrate and eliminate the data storage requirements by optically generating two separate but identical images, one image for each array and so aligned that each photosensor array sees the same information line within its associated image. This latter technique, however, requires the use of precisely aligned beam splitting components in the optical system and a lens capable of producing two displaced images which are virtually identical. It is therefore a major advantage of the adjacent bilinear photosensor arrays that only one image need be generated by the optical system, and the expensive beam splitting components may be eliminated. It is another significant advantage that the image forming quality of the lens may be specified with less stringent requirements, enabling lower cost lens components.

Figure 2B:
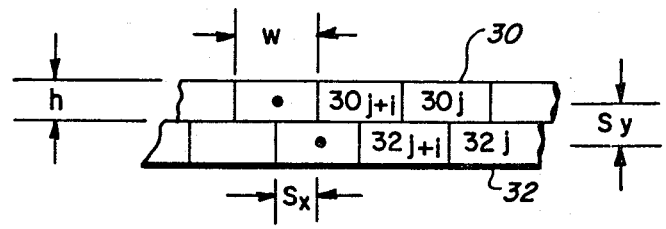
FIG. 2B is an expanded view of FIG. 2A showing the preferred geometric properties of the individual photosite apertures.

The individual photosite apertures or windows (photosensitive area associated with each photosite) will have a preferred shape, dependent upon the horizontal and vertical data sampling pitches selected for the scanner system. These relationships are illustrated with the notation of FIG. 2B. The effective horizontal sampling pitch, $S_x$, is the effective distance between the centers of pixels in a horizontal direction in FIG. 2B, considering the simultaneous sampling of both photosensor arrays 30 and 32. The vertical sampling pitch, $S_y$, is the center-to-center distance between adjacent scan lines in the image plane. For exactly adjacent photosensor arrays, it is the vertical separation between the centers of the two photosensor arrays, as shown in FIG. 2B. Parameters $S_x$ and $S_y$ are typically determined by fundamental design requirements of the scanner system, and the photosite aperture geometry is selected to produce apertures whose centers are effectively separated by $S_x$ and $S_y$ in the horizontal and vertical directions, respectively.

It is also generally desirable to maximize the photosite area within the constraints imposed by the required sampling pitches, $S_x$ and $S_y$, so that the signal-to-noise ratio of the detector is maximized. Each of the detector apertures is assumed to have approximately rectangular shape with a width, w, and a height, h, as shown in FIG. 2B. All of the photosite apertures are assumed to be nearly identical to each other. As an example, it is frequently required to sense images on equal vertical and horizontal sampling pitches or intervals; i.e., $$S_x = S_y$$

Under this condition, it is clear from FIG. 2B that $$S_x = w/2 \text{ and}$$

$$S_y = h, \tag{2}$$

or that a preferred aspect ratio for the typical photosite is $$w = 2h \tag{3}$$

For example, if the sampling pitch in the image plane is 10 um (horizontally and vertically), then each photosite aperture should have a height of 10 um and a width of 20 um. This provides a maximum aperture area which is properly centered about the selected (equal) sampling centers.

More generally, if the sampling pitches are not exactly equal, but are chosen so that the horizontal sampling pitch is equal to a numerical constant, k, times the vertical sampling pitch; i.e., $$S_x = kS_y, \quad (4)$$

then the preferred aperture aspect ratio will differ from the previous example. In this general example, combining equations (2) and (4) gives the preferred conditions $$w = 2kh. \quad (5)$$

For example, if the horizontal sample pitch were selected to be equal to 0.75 times the vertical sampling pitch (k=0.75), then the preferred aspect ratio would be $$w = 2(0.75)h, \text{ or}$$

$$w = 1.5h. \quad (6)$$

If the horizontal sampling pitch of 9 um were selected as an example, then the vertical sampling pitch would be 9/0.75=12 um. The corresponding aperture width according to equation (2) is 18 um and height is 12 um; i.e., w/h=1.5 as shown in equation (6).

It is not necessary to center the apertures according to the selected sampling pitches, as described above. If the apertures are not so centered, however, it becomes necessary to generate unequal vertical and horizontal magnifications in the optical system. Such anamorphic optical systems are difficult to design and generally very expensive to fabricate. An important advantage of the preferred aperture aspect ratio of equation (5) and the centering of the apertures on selected sampling centers is the ability to use lower cost, conventional, spherical optical systems.

Figure 3:
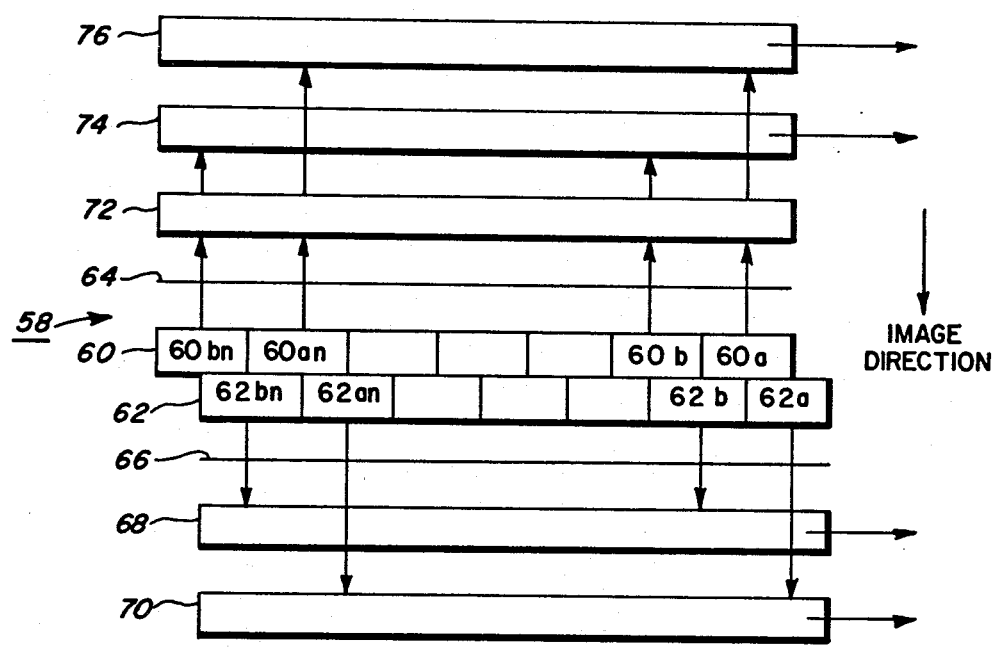
FIG. 3 is a schematic diagram of a charge coupled device for use in an imaging system in accordance with the principles of the present invention.

FIG. 3 is an improvement over the invention set forth in FIG. 2. As can be seen in FIG. 3, there are four shift registers instead of two in a quadrilinear array. With four output shift registers instead of two, the density of the CCD components on the single integrated circuit can be even greater than before, leading to a shorter, denser CCD device.

In operation, then, at time t0, the first line of data will be adjacent row 60 of photosites. As in the figures described above, there is relative movement between the imager 58 and the document or other image being scanned. In FIG. 3, it is assumed that the first line of information is relatively moving downward. At this time t0, the charge is deposited beneath each photosite in direct relation to the amount of light impinging on each said photosite. Row 60 of photosites is, accordingly, scanning and detecting the even photosites 60a, 60b, reading right to left. At time t1, the contents of charge stored at row 60 of photosites is transferred to storage register 72 via transfer gates 64 before the first line of data is incremented to row 62 of photosites. At time t2, the first scan line of data reaches row 62 of photosites, while scan line two of data now reaches row 60 of photosites. At this time row 62 of photosites scans and detects for the odd bits of data 62a, 62b in the first scan line of data, and row 60 of photosites is scanning and detecting the even pixels or bits in the second scan line of data.

At time t3, several things happen before the scan lines of data are incremented. The contents of the even bits of data from the first scan line of data are stored in register 72. At time t3, these bits sof data are transferred to registers 74 and 76 in alternate fashion. That is, the data bit from photosite 60a, stored in register 72, is transferred to shift register 76. The data bit from photosite 60b, stored in register 72 is transferred to shift register 74. This continues alternately along the row 60 of photosites to photosite 60an transferring its data bit stored in register 72 to shift register 76; while photosite 60bn transfers its data bit from storage 72 to shift register 74. As set forth above, these are the even bits for the first scan line of data.

At time t4, the odd bits in photosites 62a, 62b are transferred in similar alternate fashion to shift registers 70, 68 respectively. Thus, scan bits 62a and 62an are transferred at time t4 to shift register 70; while scan bits 62b to 62bn are transferred at time t4 to shift register 68. Thus, at the end of time t4, the scan bits of data for the first line of data now are stored in shift registers 68, 70, 74 and 76. Also at time t4, the even bits of data detected at row 60 of photosites for the second line of data is transferred to storage register 72 via transfer gate 64.

A high speed clock now can be used to shift the signals stored in shift registers 68, 70, 74, and 76 out to circuitry on or off this single integrated circuit chip for multiplexing together to form a single output pulse train indicative of the scanned video data from one line. The next lines of data are brought before the rows 60 and 62 of photosites and thus the cycle continues until all the lines of data are scanned and are read out of registers 74, 76, 68, and 70.

Typical dimensions for such a CCD array would include 10 micron wide photosites which are 5 microns high. The length of the device would approximate 1.2 inches (3 cm).

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A high density charge coupled device imaging array (58) on a single integrated circuit chip comprising a first row (60) of photosites deposited on said integrated circuit chip, said photosites being sensitive to applied light information, a second row (62) of photosites deposited on said integrated circuit chip immediately adjacent to and contiguous with said first row of photosites, said second row of photosites being offset from said first row of photosites approximately one-half the length of the individual photosites on said first row such that said second row of photosites are sensitive to applied light information intermediate the photosites in said first row of photosites, said first and second rows of photosites comprising a bilinear array of photosites, a first storage register (72) deposited on said integrated circuit chip adjacent to said first row (60) of photosites to receive and store the bits of light information detected by said first row of photosites (60) and converted to electronic charge information, wherein the improvement is characterized by:

a second storage register (68) deposited on said integrated circuit chip adjacent to said row (62) of photosites to receive and store alternate bits of light information detected by said second row of photosites and converted to electronic charge information, a third storage register (70) deposited on said integrated circuit chip adjacent to said second storage register (68) to receive and store the remaining bits of light information detected by said second row of photosites and converted to electronic charge information, a fourth storage register (74) deposited on said integrated circuit chip adjacent to said first storage register (72) to receive and store alternate intermediate bits of light information detected by said first row (60) of photosites, converted to electronic charge information and received by said first storage register (72):

a fifth storage register (76) deposited on said integrated circuit chip adjacent to said fourth storage register (74) to receive and store the remaining bits of light information detected by said first row (60) of photosites converted to electronic charge information and received by said first storage register (72), and wherein said second (68), third (70), fourth (74), and fifth (76) storage registers comprise a quadrilinear array such that all four registers contain the detected light information from one line of scan at the same time.

2. The imaging array as set forth in claim 1 further including, transfer gate means (64, 66) deposited between the first row (60) of photosites and the first storage register (72), the second row (62) of photosites and the second (68) and third (70) storage registers, said transfer gates also being deposited on said integrated circuit chip to provide paths for the movement of said electronic charge information.

3. A high density charge coupled device imaging array (58) on a single integrated circuit chip for use in detection of information contained in repetitive line scans comprising:

a first row (60) of photosites formed on said integrated circuit chip, said photosites being sensitive to applied light information in one scan line in the form of data bits by depositing electronic charge in the substrate of said chip in response to said applied light information, a second row of photosites (62) formed on said integrated circuit chip immediately adjacent to and contiguous with said first row (60) of photosites, said second row (62) of photosites being offset from said first row of photosites intermediate the centers of the photosites in said first row of photosites such that said second row of photosites are sensitive to applied light information in one scan line in the form of data bits by depositing electronic charge in the substrate of said chip in response to applied light information intermediate the photosites in said first row of photosites, said first and second rows of photosites comprising a bilinear array of said photosites which consecutively scan the same lines of information in a raster scan type of arrangement, a first storage register (72) formed on said integrated circuit chip adjacent to said first row (60) of photosites to receive and store the bits of light information detected by said first row of photosites (60) and converted to electronic charge information, wherein the improvement is characterized by:

a second storage register (68) formed in said integrated circuit chip adjacent to said second row (62) of photosites to receive and store alternate data bits from said same scan line of information as detected by said second row (62) of photosites, a third storage register (70) deposited on said integrated circuit chip adjacent to said second storage register (68) to receive and store the remaining bits from said same scan line of information as detected by said second row (62) of photosites, a fourth storage register (74) formed on said integrated circuit chip adjacent to said first storage register (72) to receive and store alternate intermediate data bits from said same scan line of information as detected by said second row (62) of photosites, a fifth storage register (76) formed on said integrated circuit chip adjacent to said fourth storage register (74) to receive and store the remaining data bits from said same scan line of information as detected by said second row (62) of photosites, and wherein said second (68), third (70), fourth (74), and fifth (76) storage register comprise a quadrilinear array such that all four of said registers contain the data bits from said same scan line of information at the same time.

4. The imaging arrays as set forth in claim 3 further including, transfer gate means (64, 66) formed between the first row (60) of photosites and the first storage register (72), the second row (62) of photosites and the second (68) and third (70) storage registers, said transfer gates also being formed on said integrated circuit chip to provide paths for the movement of the electronic charge information representing said data bits.

* * * * *